US012019386B2

(12) United States Patent
Ishida et al.

(10) Patent No.: US 12,019,386 B2
(45) Date of Patent: Jun. 25, 2024

(54) IMAGE FORMING APPARATUS WITH HEATING UNIT ROCKABLE BETWEEN REFERENCE ATTITUDE AND TILTED ATTITUDE

(71) Applicant: KYOCERA Document Solutions Inc., Osaka (JP)

(72) Inventors: Keiju Ishida, Osaka (JP); Takehiro Sato, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/181,510

(22) Filed: Mar. 9, 2023

(65) Prior Publication Data

US 2023/0288854 A1 Sep. 14, 2023

(30) Foreign Application Priority Data

Mar. 10, 2022 (JP) ................................ 2022-036973

(51) Int. Cl.

| | |
|---|---|
| ***G03G 15/20*** | (2006.01) |
| ***G03G 21/16*** | (2006.01) |
| ***H05B 6/14*** | (2006.01) |

(52) U.S. Cl.

CPC ..... *G03G 15/2053* (2013.01); *G03G 15/2017* (2013.01); *G03G 15/2064* (2013.01); *G03G 21/1685* (2013.01); *H05B 6/145* (2013.01); *G03G 21/1633* (2013.01); *G03G 2215/2038* (2013.01)

(58) Field of Classification Search

CPC ........... G03G 15/2053; G03G 15/2064; G03G 15/2032; G03G 21/1633; G03G 2215/2003; G03G 2221/1639; G03G 21/1685; G03G 15/2017; G03G 2215/2038; H05B 6/145

See application file for complete search history.

(56) References Cited

U.S. PATENT DOCUMENTS

2006/0285893 A1* 12/2006 Ishii .................. G03G 15/2039 399/329
2012/0148304 A1* 6/2012 Sugaya ............. G03G 15/2053 399/329
2012/0155918 A1* 6/2012 Egi .................... G03G 15/2053 399/329

(Continued)

FOREIGN PATENT DOCUMENTS

JP 2021086093 A 6/2021

*Primary Examiner* — Arlene Heredia
*Assistant Examiner* — Laura Roth
(74) *Attorney, Agent, or Firm* — Alleman Hall & Tuttle LLP

(57) ABSTRACT

A heating unit includes a to-be-engaged portion. A fixing unit includes an engagement portion. The heating unit or the fixing unit includes an engagement guide portion. A movement mechanism retains the heating unit in a tilted attitude when causing the heating unit to move at a position set apart from the fixing unit. The engagement guide portion causes the heating unit to rock from the tilted attitude to a reference attitude while guiding the to-be-engaged portion to the engagement portion. The engagement portion engages with the to-be-engaged portion to restrict a movement of the heating unit in a longitudinal direction. A unit bias portion retains an engagement state between the engagement portion and the to-be-engaged portion.

5 Claims, 7 Drawing Sheets

(56) References Cited

U.S. PATENT DOCUMENTS

| | | | | |
|---|---|---|---|---|
| 2014/0037308 | A1* | 2/2014 | Nawa | G03G 15/2053 399/45 |
| 2017/0308010 | A1* | 10/2017 | Okajima | G03G 15/2053 |
| 2021/0165352 | A1* | 6/2021 | Sato | G03G 15/2017 |
| 2023/0195012 | A1* | 6/2023 | Izumichi | G03G 21/1633 399/322 |
| 2023/0195013 | A1* | 6/2023 | Izumichi | G03G 15/2035 |
| 2023/0288848 | A1* | 9/2023 | Sato | G03G 15/2064 |
| 2023/0288853 | A1* | 9/2023 | Morita | G03G 15/2053 |
| 2023/0288854 | A1* | 9/2023 | Ishida | G03G 15/2053 |

* cited by examiner

IMAGE FORMING APPARATUS WITH HEATING UNIT ROCKABLE BETWEEN REFERENCE ATTITUDE AND TILTED ATTITUDE

INCORPORATION BY REFERENCE

This application is based upon and claims the benefit of priority from the corresponding Japanese Patent Application No. 2022-036973 filed on Mar. 10, 2022, the entire contents of which are incorporated herein by reference.

BACKGROUND

The present disclosure relates to an electrophotographic image forming apparatus including a heating unit and a fixing unit.

In the electrophotographic image forming apparatus, a toner image is transferred onto a sheet from an image-carrying member, and the toner image is fixed onto the sheet by a fixing device.

The fixing device may be sectioned into a heating unit including a heater and a fixing unit including a fixing member and a pressure roller. The heater heats the fixing member.

Further, the image forming apparatus is known to include a mechanism which causes the heating unit to move from a heating position to an evacuation position in conjunction with an operation to an operation portion. When the heating unit is evacuated to the evacuation position, the fixing unit can be drawn out from a main body.

SUMMARY

An image forming apparatus according to an aspect of the present disclosure includes a heating unit, a fixing unit, a movement mechanism, and a unit bias portion. The heating unit includes a heater and is disposed along a first direction in a main body. The fixing unit includes a fixing member that is heated by the heater and a pressure member that biases a sheet toward the fixing member, and is disposed next to the heating unit along the first direction in the main body. The movement mechanism causes the heating unit to move along a second direction as an array direction of the heating unit and the fixing unit. The unit bias portion biases the heating unit toward the fixing unit when the heating unit is at a reference position in the second direction. The heating unit includes a to-be-engaged portion. The fixing unit includes an engagement portion. The heating unit or the fixing unit includes an engagement guide portion. The engagement portion engages with the to-be-engaged portion when the heating unit is at the reference position. The engagement guide portion guides the to-be-engaged portion to the engagement portion. The heating unit is connected to the movement mechanism in a state where the heating unit is capable of rocking between a reference attitude and a tilted attitude that is tilted downwardly in an oblique direction toward the fixing unit. The movement mechanism retains the heating unit in the tilted attitude when causing the heating unit to move at a position farther away from the fixing unit than the reference position. The engagement guide portion causes, when the heating unit moves toward the reference position, the heating unit to rock from the tilted attitude to the reference attitude while guiding the to-be-engaged portion to the engagement portion. The engagement portion engages with the to-be-engaged portion to restrict a movement of the heating unit in a longitudinal direction intersecting with the first direction and the second direction. The unit bias portion biases the heating unit to retain an engagement state between the engagement portion and the to-be-engaged portion.

According to the present disclosure, it is possible to provide an image forming apparatus capable of, when causing the heating unit to move from a position set apart from the fixing unit to the reference position, positioning the heating unit at the reference position for sure.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the attached drawings. It is noted that the following embodiment is an embodied example of the present disclosure and does not limit the technical scope of the present disclosure.

[Configuration of Image Forming Apparatus 10]

An image forming apparatus 10 according to the embodiment executes print processing using electrophotography. The print processing is processing of forming an image on a sheet 900.

Figure 1:
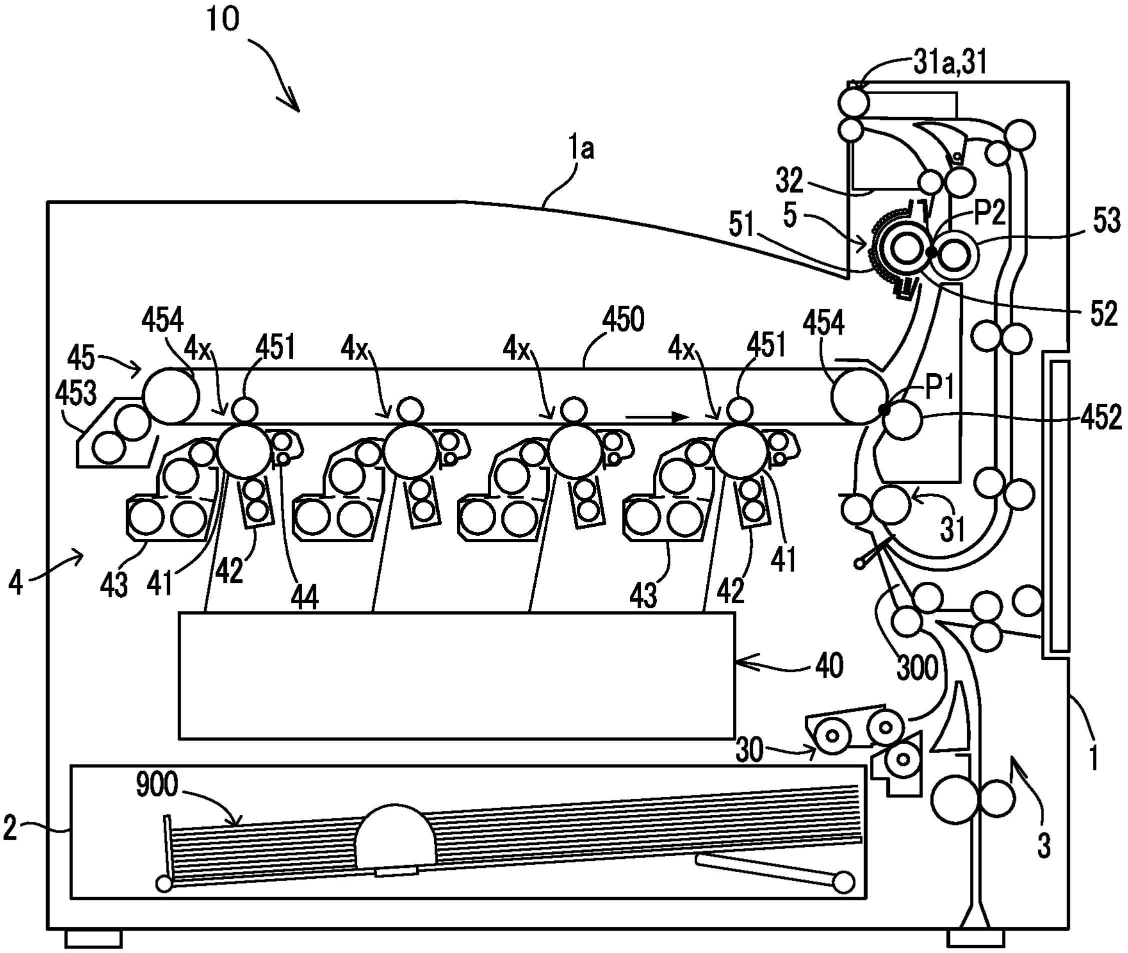
FIG. 1 is a configuration diagram of an image forming apparatus according to an embodiment.

As shown in FIG. 1, the image forming apparatus 10 includes a sheet storing portion 2, a sheet conveying device 3, and a printing device 4. The sheet conveying device 3 and the printing device 4 are housed in a main body 1 as a housing.

The sheet storing portion 2 is capable of storing a plurality of sheets 900. The sheet conveying device 3 includes a sheet feed device 30 and a plurality of conveying roller pairs 31.

The sheet feed device 30 feeds the sheets 900 in the sheet storing portion 2 one by one to a conveying path 300. The conveying path 300 is a path of the sheets 900.

The plurality of conveying roller pairs 31 convey the sheet 900 along the conveying path 300. The plurality of conveying roller pairs 31 include a discharge roller pair 31*a* (see FIG. 1). The discharge roller pair 31*a* discharges the sheet 900 formed with an image onto a discharge tray 1*a* from the conveying path 300.

The printing device 4 executes the print processing on the sheet 900 conveyed along the conveying path 300. The image to be formed on the sheet 900 is a toner image.

The printing device 4 includes a laser scanning unit 40, one or more image forming portions 4*x*, a transfer device 45, and a fixing device 5. The image forming portion 4*x* includes a photoconductor 41, a charging device 42, a developing device 43, and a drum cleaning device 44.

The charging device 42 charges a surface of the photoconductor 41. The laser scanning unit 40 scans beam light on the charged surface of the photoconductor 41. Thus, the laser scanning unit 40 forms an electrostatic latent image on the surface of the photoconductor 41.

By supplying toner to the surface of the photoconductor 41, the developing device 43 develops the electrostatic latent image into a toner image. The transfer device 45 transfers the toner image formed on the surface of the photoconductor 41 onto the sheet 900.

The transfer device 45 transfers the toner image onto the sheet 900 at a transfer position P1 on the conveying path 300.

In the present embodiment, the printing device 4 is a tandem-type color printing device including a plurality of image forming portions 4*x*. Further, the transfer device 45 includes an intermediate transfer belt 450, a plurality of primary transfer devices 451, a secondary transfer device 452, and a belt cleaning device 453.

In the example shown in FIG. 1, the printing device 4 includes four image forming portions 4*x* respectively corresponding to toner of four colors, that is, yellow, magenta, cyan, and black. The transfer device 45 includes four primary transfer devices 451 respectively corresponding to the four image forming portions 4*x*.

The intermediate transfer belt 450 is rotatably supported by a plurality of supporting rollers 454. One of the plurality of supporting rollers 454 rotates by being driven by a belt drive device (not shown). Thus, the intermediate transfer belt 450 rotates.

Each of the primary transfer devices 451 transfers the toner image formed on the surface of the photoconductor 41 in the corresponding one of the image forming portions 4*x* onto a surface of the intermediate transfer belt 450. Thus, a synthetic toner image obtained by synthesizing the toner images of four colors is formed on the surface of the intermediate transfer belt 450.

The intermediate transfer belt 450 rotates while carrying the synthetic toner image. The secondary transfer device 452 transfers the synthetic toner image formed on the surface of the intermediate transfer belt 450 onto the sheet 900 at the transfer position P1.

The drum cleaning device 44 removes primary waste toner from the surface of the photoconductor 41. The primary waste toner is toner that remains on a part of the surface of the photoconductor 41, that has passed through the primary transfer device 451.

The belt cleaning device 453 removes secondary waste toner from the surface of the intermediate transfer belt 450. The secondary waste toner is toner that remains on a part of the surface of the intermediate transfer belt 450, that has passed through the secondary transfer device 452.

The fixing device 5 heats and pressurizes the synthetic toner image on the sheet 900 at a fixing position P2 on the conveying path 300. Thus, the fixing device 5 fixes the synthetic toner image onto the sheet 900. The fixing position P2 is a position on a downstream side of the transfer position P1 in a sheet conveying direction.

Figure 2:
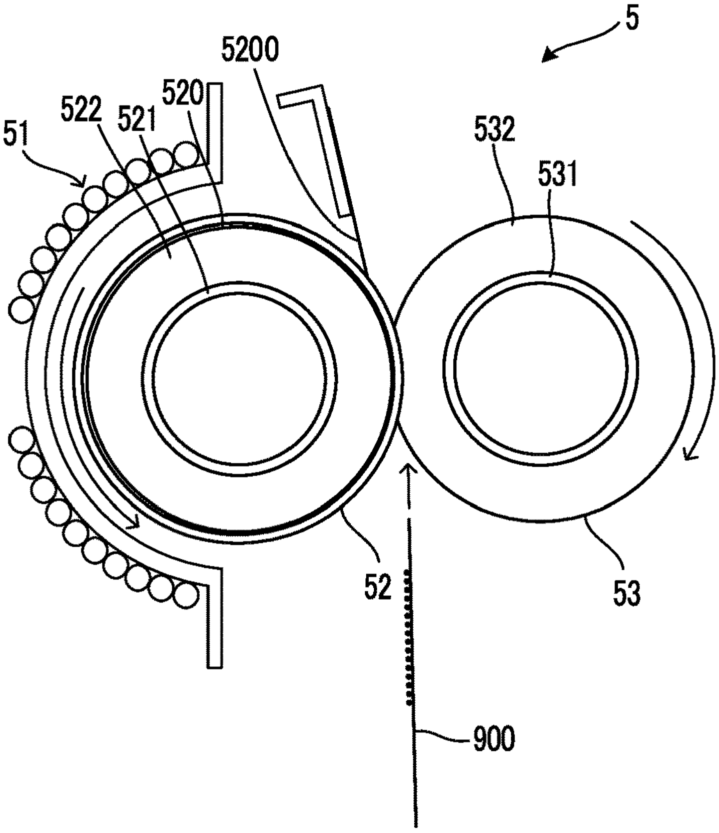
FIG. 2 is a diagram showing a configuration of a main portion of a fixing device in the image forming apparatus according to the embodiment.

As shown in FIG. 2, the fixing device 5 includes a heater 51, a fixing belt 52, a fixing roller 520, a pressure roller 53, and a sheet separation member 5200.

The fixing belt 52 is a flexible cylindrical member including the fixing roller 520 therein. The fixing belt 52 is heated by the heater 51.

The fixing roller 520 is a cylindrical member which supports the fixing belt 52 from an inner side of the fixing belt 52. The fixing roller 520 includes a cylindrical core metal portion 521 and an elastic portion 522 formed on an outer circumference of the core metal portion 521.

The fixing roller 520 is supported rotatably. The fixing belt 52 is capable of rotating with the fixing roller 520.

The fixing belt 52 includes a conductive base material, an elastic layer formed on an outer circumference of the base material, and a release layer formed on an outer circumference of the elastic layer.

The heater 51 is disposed so as to oppose an outer circumferential surface of the fixing belt 52. In the present embodiment, the heater 51 is a heating device that uses an induction heating system. The heater 51 mainly heats the base material of the fixing belt 52 by electromagnetic induction.

The pressure roller 53 is supported rotatably. Similar to the fixing roller 520, the pressure roller 53 also includes a cylindrical core metal portion 531 and an elastic portion 532 formed on an outer circumference of the core metal portion 531.

The pressure roller 53 rotates by being driven by a drive device (not shown). The fixing belt 52 and the fixing roller 520 rotate in conjunction with the pressure roller 53.

The fixing belt 52 heats the toner image formed on the sheet 900. The pressure roller 53 pressurizes the toner image toward the sheet 900.

It is noted that the fixing belt 52 is an example of a fixing member that is heated by the heater 51. The pressure roller 53 is an example of a pressure member that biases the sheet 900 toward the fixing belt 52.

The sheet separation member 5200 peels the sheet 900 off from the fixing belt 52 when the sheet 900 adheres onto the fixing belt 52.

The discharge roller pair 31*a* is capable of discharging the sheet 900 that has passed between the fixing belt 52 and the pressure roller 53 onto the discharge tray 1*a* (see FIG. 1).

Figure 4:
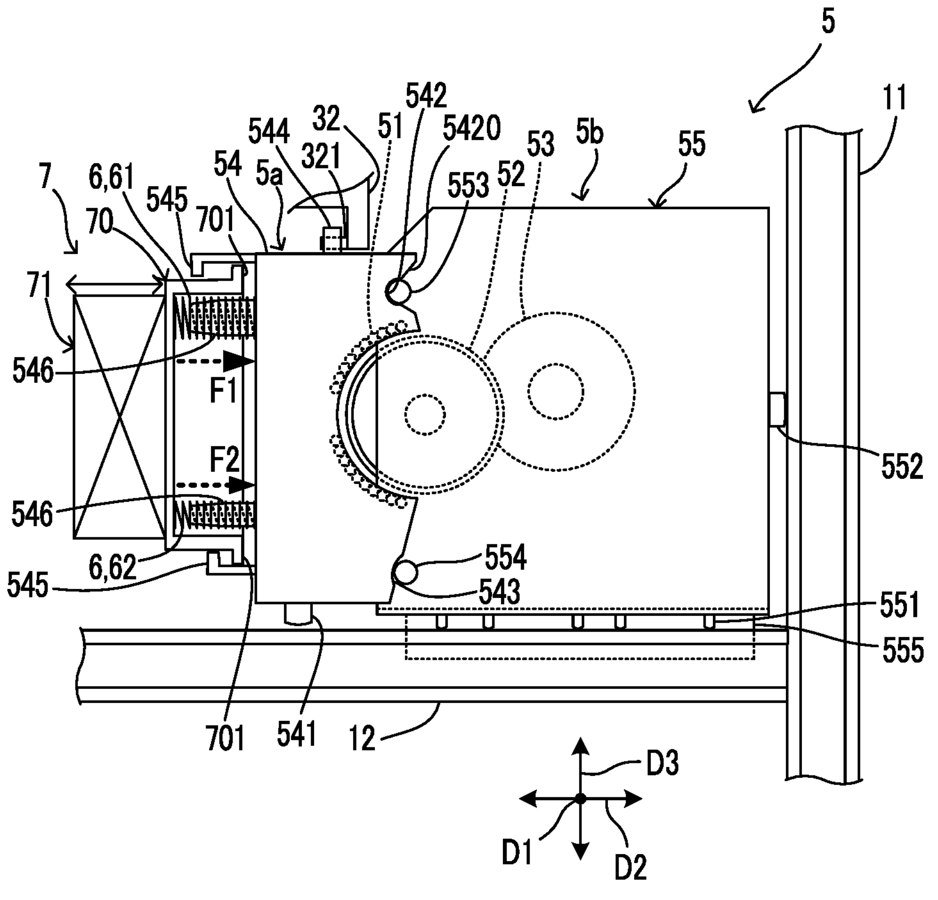
FIG. 4 is a side view showing a configuration of a heating unit at a reference position and a peripheral portion thereof in the image forming apparatus according to the embodiment.
Figure 5:
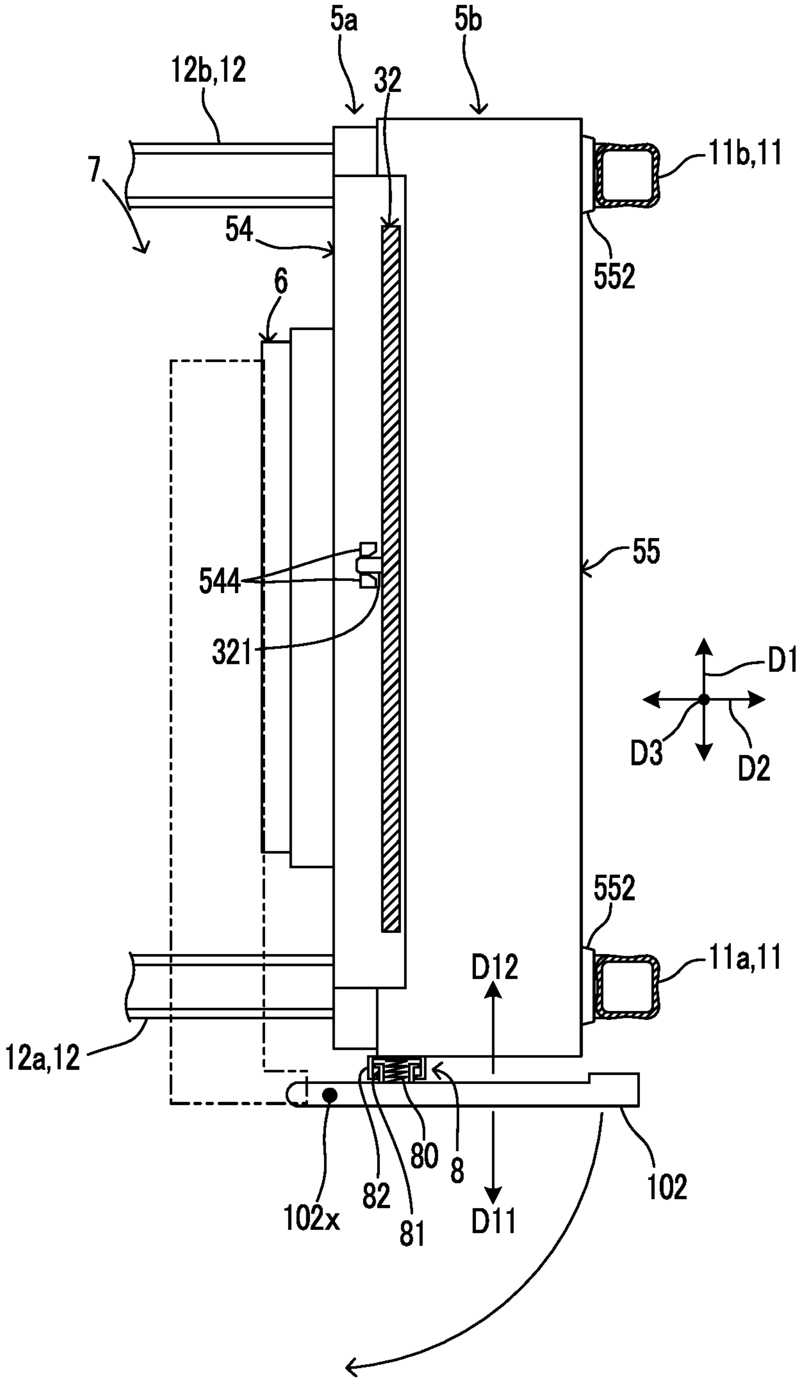
FIG. 5 is a plan view showing a configuration of the heating unit and the peripheral portion thereof in the image forming apparatus according to the embodiment.

In the present embodiment, the fixing device 5 is sectioned into a heating unit 5*a* and a fixing unit 5*b* (see FIG. 4 and FIG. 5). The heating unit 5*a* includes the heater 51. The fixing unit 5*b* includes the fixing roller 520, the fixing belt 52, and the pressure roller 53. The fixing unit 5*b* is disposed next to the heating unit 5*a*.

Further, a discharge unit 32 is disposed above the fixing unit 5*b* (see FIG. 1). The discharge unit 32 includes the discharge roller pair 31*a* and a sheet guide member. The sheet guide member guides the sheet 900 conveyed from the fixing device 5 to the discharge roller pair 31*a*.

The discharge unit 32 is fixed to a main body frame 1*x*. The discharge unit 32 is an example of a fixed unit fixed inside the main body 1.

The heating unit 5*a* is disposed along a first direction D1 in the main body 1. The fixing unit 5*b* is also disposed along the first direction D1 in the main body 1.

In the present embodiment, the first direction D1 is a depth direction of the image forming apparatus 10. When the fixing unit 5*b* is attached to the main body 1, a direction along a center line of a rotation of the fixing belt 52 and the pressure roller 53 is the first direction D1.

The heating unit 5*a* and the fixing unit 5*b* are arranged next to each other in a second direction D2. In other words, the second direction D2 is an array direction of the heating unit 5*a* and the fixing unit 5*b*. The second direction D2 is a direction that intersects with the first direction D1.

By the heating unit 5*a* being moved to a position set apart from the fixing unit 5*b*, the fixing unit 5*b* can be drawn out from the main body 1.

Figure 7:
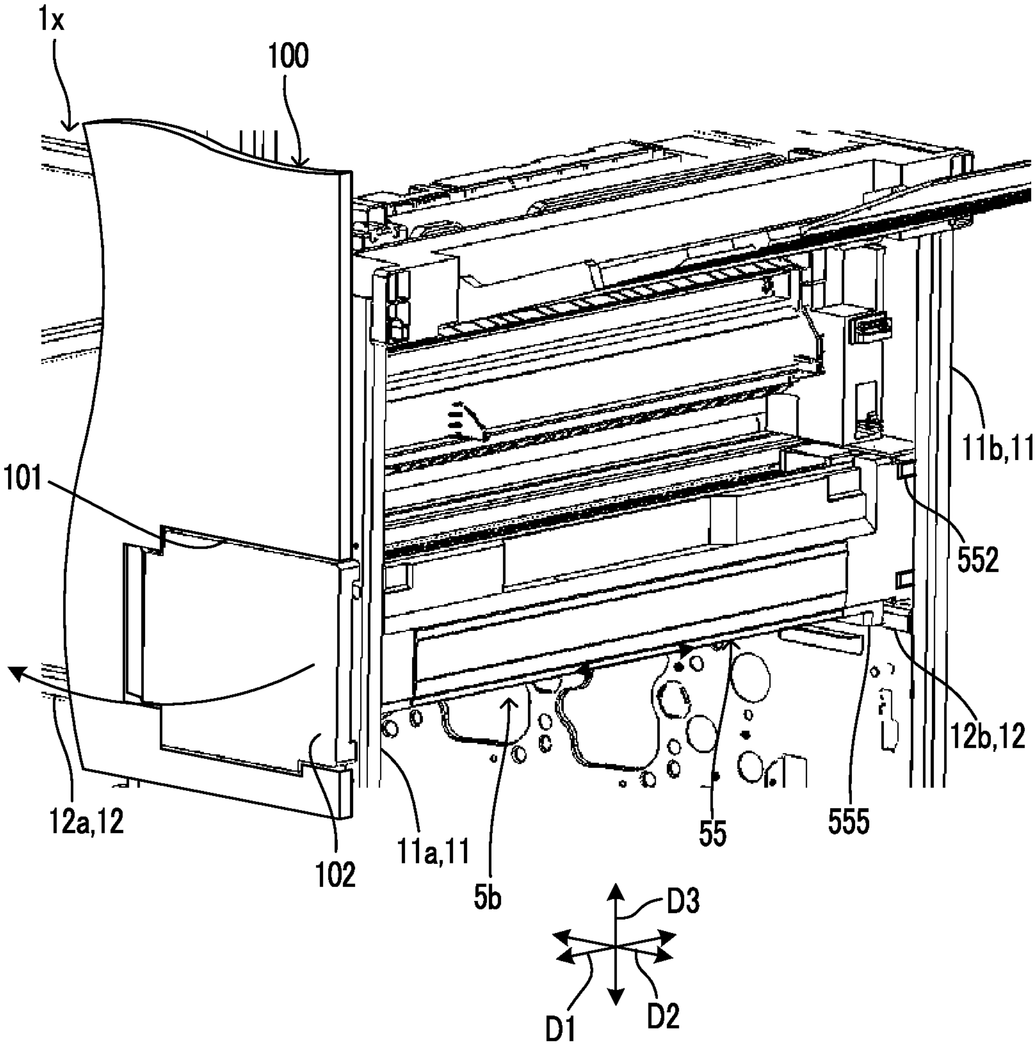
FIG. 7 is a perspective view showing peripheral parts of a fixing unit and a cover member in the image forming apparatus according to the embodiment.

An exterior member 100 includes an opening portion 101 and a cover member 102 (see FIG. 7). The opening portion 101 is a part where an opening that opens one end of the fixing unit 5*b* in the first direction D1 is formed.

The cover member 102 is supported by a supporting shaft 102*x*. Thus, the cover member 102 is rotatable about the supporting shaft 102*x*. The cover member 102 is rotatable between a closing position at which the opening portion 101 is closed and an opening position at which the opening portion 101 is opened.

When the fixing unit 5*b* is drawn out from the main body 1, the fixing unit 5*b* can pass through the opening portion 101 of the exterior member 100.

Incidentally, it is important to dispose the heater 51 at an appropriate position with respect to the fixing belt 52 for enhancing a heating efficiency of the fixing belt 52 by the heater 51. In a case where the heating device that uses an induction heating system is adopted as the heater 51, a positional accuracy of the heater 51 is particularly important.

Figure 6:
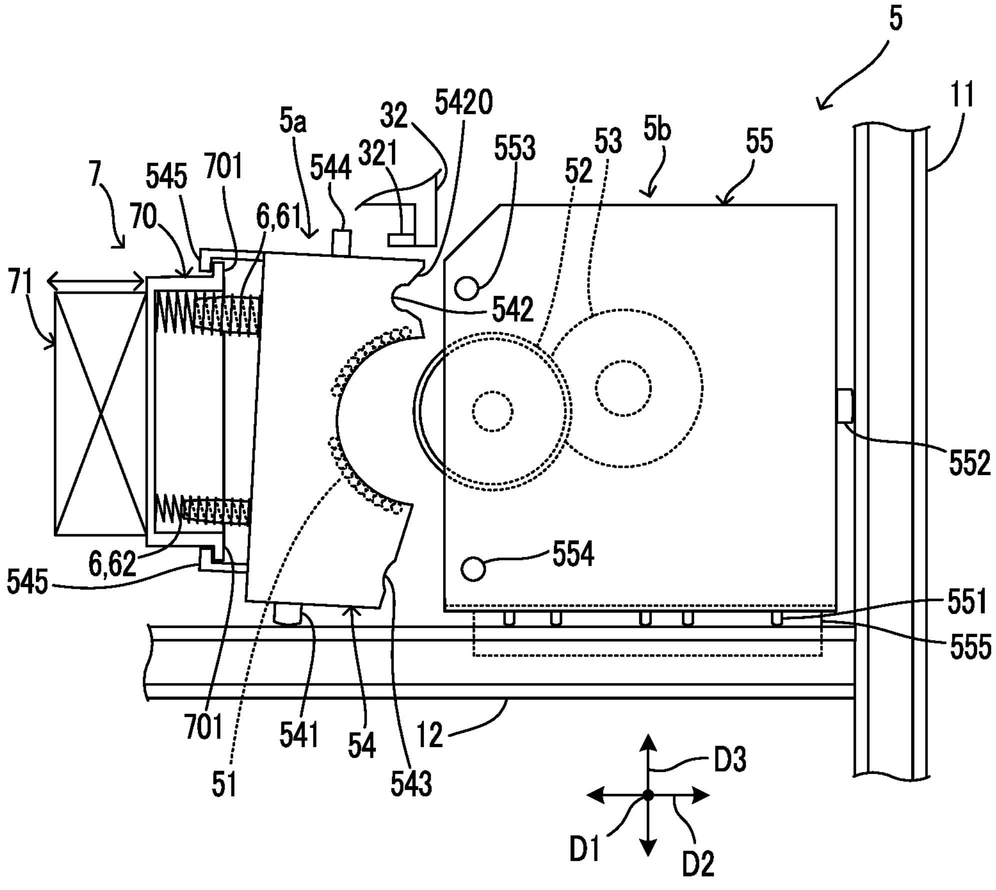
FIG. 6 is a side view showing a configuration of the heating unit at an evacuation position and the peripheral portion thereof in the image forming apparatus according to the embodiment.

Moreover, for enabling the fixing unit 5*b* to be drawn out from the main body 1, a movement mechanism 7 for moving the heating unit 5*a* is necessary (see FIG. 4 to FIG. 6). The movement mechanism 7 has a proximity function and an evacuation function.

The proximity function is a function of positioning the heating unit 5*a* at a reference position close to the fixing unit 5*b*. The evacuation function is a function of moving the heating unit 5*a* to an evacuation position set apart from the fixing unit 5*b*.

Therefore, when the heating unit 5*a* moves from the evacuation position to the reference position, the movement mechanism 7 is required to be capable of positioning the heating unit 5*a* at the reference position for sure.

Hereinafter, configurations of the heating unit 5*a* and the fixing unit 5*b* will be described.

[Configurations of Heating Unit 5*a* and Fixing Unit 5*b*]

The heating unit 5*a* includes the heater 51 and a first supporting member 54 (see FIG. 4 and FIG. 6). The first supporting member 54 is a member which supports the heater 51.

The fixing unit 5*b* includes the fixing belt 52, the fixing roller 520, the pressure roller 53, and a second supporting member 55 (see FIG. 4 and FIG. 6).

The second supporting member 55 rotatably supports the fixing roller 520 and the pressure roller 53. The fixing roller 520 supports the fixing belt 52. In other words, the fixing belt 52 is supported by the second supporting member 55 via the fixing roller 520.

[Mechanism for Positioning Heating Unit 5*a* and Fixing Unit 5*b*]

Figure 3:
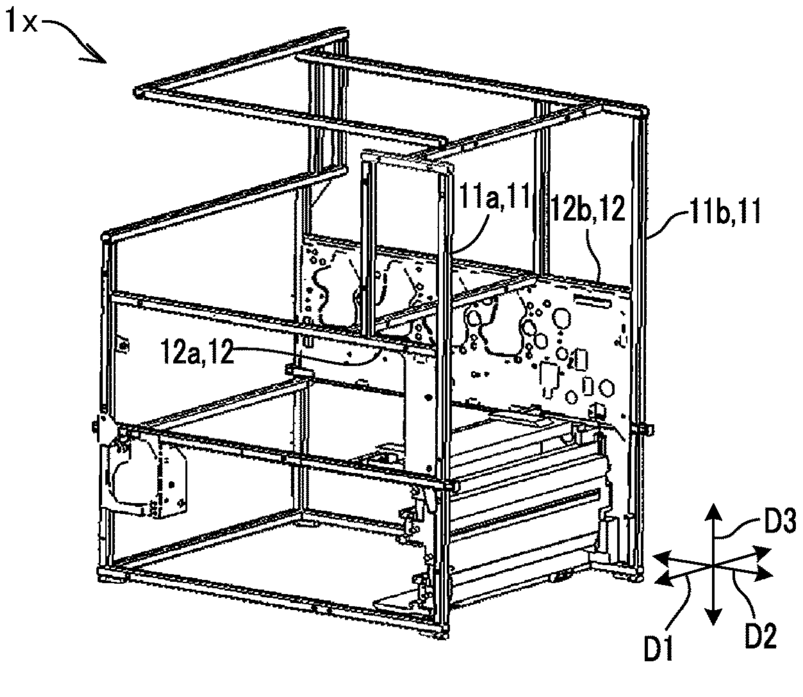
FIG. 3 is a perspective view of a main body frame in the image forming apparatus according to the embodiment.

The image forming apparatus 10 includes the main body frame 1*x* and the exterior member 100 (see FIG. 3 and FIG. 7). The main body frame 1*x* forms a framework of the main body 1. The exterior member 100 forms an exterior of the main body 1.

The main body frame 1*x* is constituted by a combination of a plurality of metal pipes (see FIG. 3). The heating unit 5*a* and the fixing unit 5*b* are supported by the main body frame 1*x*.

The exterior member 100 is attached to the main body frame 1*x* (see FIG. 7). The exterior member 100 forms an exterior of the image forming apparatus 10.

The plurality of metal pipes constituting the main body frame 1*x* include two supporting column portions 11 and two beam portions 12 (see FIG. 3).

The two supporting column portions 11 are formed to extend in a longitudinal direction D3 and are spaced apart from each other in the first direction D1 (see FIG. 3). The longitudinal direction D3 is an up-down direction.

The two supporting column portions 11 are formed next to the fixing unit 5*b* while extending in the longitudinal direction D3 (see FIG. 4 and FIG. 6).

The two supporting column portions 11 include a first supporting column portion 11*a* disposed on a front surface side of the image forming apparatus 10 and a second supporting column portion 11*b* disposed on a back surface side of the image forming apparatus 10 (see FIG. 3).

The two beam portions 12 are formed to extend in a lateral direction below the heating unit 5*a* and the fixing unit 5*b*, and are spaced apart from each other in the first direction D1 (see FIG. 3 and FIG. 5). The lateral direction is a width direction of the image forming apparatus 10.

The two beam portions 12 are respectively connected to the two supporting column portions 11 (see FIG. 3). For example, the two beam portions 12 are respectively connected to the two supporting column portions 11 by welding.

The two beam portions 12 include a first beam portion 12*a* disposed on the front surface side of the image forming apparatus 10 and a second beam portion 12*b* disposed on the back surface side of the image forming apparatus 10 (see FIG. 3).

The fixing unit 5*b* is disposed between the heating unit 5*a* and the two supporting column portions 11 (see FIG. 4).

The first supporting member 54 of the heating unit 5*a* is placed on the two beam portions 12 while being bridged between the two beam portions 12. Similarly, the second supporting member 55 of the fixing unit 5*b* is placed on the two beam portions 12 while being bridged between the two beam portions 12.

In other words, neither the heating unit 5*a* nor the fixing unit 5*b* is fixed to the main body frame 1*x* by a fixture such as a screw.

Figure 8:
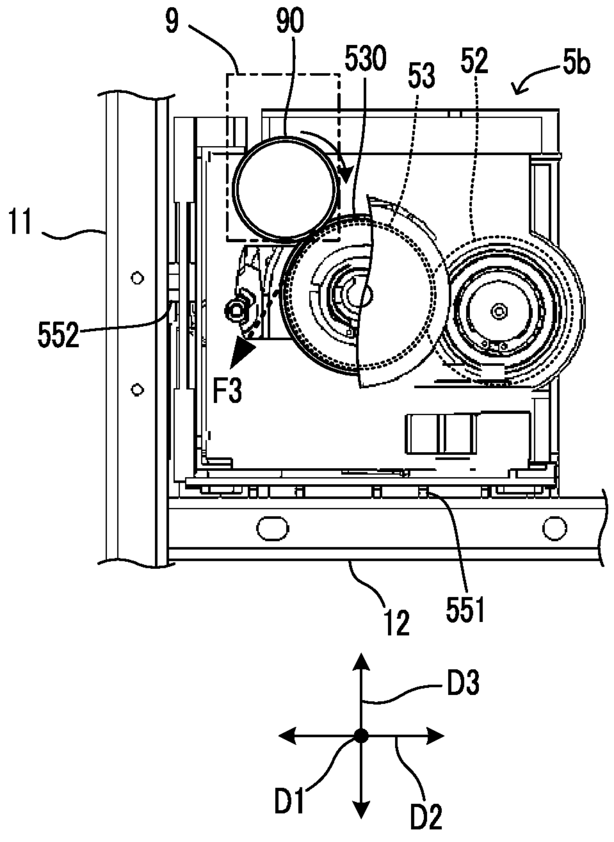
FIG. 8 is a diagram showing a back surface of the fixing unit and a drive mechanism in the image forming apparatus according to the embodiment.

The heating unit 5*a* and the fixing unit 5*b* are placed on the two beam portions 12 in a state where longitudinal directions thereof are set along the first direction D1 (see FIG. 7 and FIG. 8).

The image forming apparatus 10 further includes a unit bias portion 6 (see FIG. 4 and FIG. 6). The unit bias portion 6 and the movement mechanism 7 are arranged inside the main body 1.

The unit bias portion 6 includes a first spring portion 61 and a second spring portion 62 (see FIG. 4 and FIG. 6). The movement mechanism 7 includes an action member 70 and an interlocking mechanism 71 (see FIG. 4 and FIG. 5). The action member 70 is disposed on an opposite side of the fixing unit 5*b* from the heating unit 5*a*. The action member 70 is connected to the first supporting member 54.

The first supporting member 54 of the heating unit 5*a* includes a plurality of first to-be-engaged portions 542 and a second to-be-engaged portion 544 (see FIG. 4 and FIG. 5). The first supporting member 54 further includes a plurality of unit contact portions 543 (see FIG. 4).

The second supporting member 55 of the fixing unit 5*b* includes a plurality of first engagement portions 553 respectively corresponding to the plurality of first to-be-engaged portions 542 (see FIG. 4). The second supporting member 55 further includes a plurality of to-be-contacted portions 554 respectively corresponding to the plurality of unit contact portions 543 (see FIG. 4).

In the present embodiment, the first supporting member 54 includes a pair of first to-be-engaged portions 542 respectively formed at two positions set apart from each other in the first direction D1. In addition, the first supporting member 54 includes a pair of unit contact portions 543 respectively formed at two positions set apart from each other in the first direction D1.

The pair of unit contact portions 543 are formed at positions set apart from the first to-be-engaged portions 542 in the longitudinal direction D3.

The second supporting member 55 includes a pair of first engagement portions 553 formed at two positions respectively corresponding to the pair of first to-be-engaged portions 542. In addition, the second supporting member 55 includes a pair of to-be-contacted portions 554 formed at two positions respectively corresponding to the pair of unit contact portions 543.

In the present embodiment, each of the first to-be-engaged portions 542 has a concave shape that is opened in the second direction D2 (see FIG. 4). Further, each of the first engagement portions 553 has a convex shape that fits into the first to-be-engaged portion 542.

It is noted that each of the first to-be-engaged portions 542 may have a convex shape. In this case, each of the first engagement portions 553 has a concave shape that is opened in the second direction D2.

Furthermore, the discharge unit 32 includes a second engagement portion 321 corresponding to the second to-be-engaged portion 544 (see FIG. 4 and FIG. 5). The discharge unit 32 is an example of a fixed unit fixed to the main body 1.

The pair of first engagement portions 553 respectively engage with the pair of first to-be-engaged portions 542 when the heating unit 5*a* is at the reference position. The pair of first engagement portions 553 respectively engage with the pair of first to-be-engaged portions 542 to restrict a movement of the heating unit 5*a* in the longitudinal direction D3. The longitudinal direction D3 is an example of a third direction intersecting with the first direction D1 and the second direction D2.

The second engagement portion 321 of the discharge unit 32 engages with the second to-be-engaged portion 544 to restrict a movement of the heating unit 5*a* in the first direction D1.

In the present embodiment, the second engagement portion 321 has a convex shape formed along the second direction D2 (see FIG. 4 and FIG. 5). The second to-be-engaged portion 544 is a pair of erected portions opposing each other in the first direction D1 (see FIG. 5). The second engagement portion 321 is inserted between the pair of erected portions of the second to-be-engaged portion 544. Thus, the second engagement portion 321 engages with the second to-be-engaged portion 544.

The unit bias portion 6 is disposed on the opposite side of the fixing unit 5*b* from the heating unit 5*a* in the main body 1 (see FIG. 4 and FIG. 6). The unit bias portion 6 biases the first supporting member 54 to bring the first supporting member 54 into contact with the second supporting member 55.

In the present embodiment, the first spring portion 61 includes a pair of first compression springs arranged apart from each other in the first direction D1. Similarly, the second spring portion 62 includes a pair of second compression springs arranged apart from each other in the first direction D1. The pair of first compression springs and the pair of second compression springs are each an example of an elastic member.

For example, the pair of first compression springs and the pair of second compression springs are respectively supported by four protrusion portions 546 included in the first supporting member 54.

The action member 70 and the heating unit 5*a* sandwich the unit bias portion 6 (see FIG. 4). The unit bias portion 6 biases the first supporting member 54 toward the second supporting member 55 by an elastic force (see FIG. 4).

In descriptions below, a bias force of the first spring portion 61 with respect to the first supporting member 54 will be referred to as a first bias force F1 (see FIG. 4). In addition, a bias force of the second spring portion 62 with respect to the first supporting member 54 will be referred to as a second bias force F2.

A force obtained by adding the first bias force F1 and the second bias force F2 is larger than a static frictional force of the heating unit 5*a* and the fixing unit 5*b* with respect to the two beam portions 12 (see FIG. 4).

The first supporting member 54 includes ribs 541 that are slidable on upper surfaces of the two beam portions 12. Similarly, the second supporting member 55 includes a plurality of ribs 551 that are slidable on the upper surfaces of the two beam portions 12. The ribs 541 of the first supporting member 54 and the ribs 551 of the second supporting member 55 are provided for reducing the static frictional force.

The pair of unit contact portions 543 are formed below the pair of first to-be-engaged portions 542 in the heating unit 5*a* (see FIG. 4 and FIG. 6).

The first spring portion 61 elastically biases the heating unit 5*a* toward the fixing unit 5*b* at a position corresponding to the position of the first to-be-engaged portion 542 in the longitudinal direction D3. The first spring portion 61 is an example of a first elastic portion.

The second spring portion 62 elastically biases the heating unit 5*a* toward the fixing unit 5*b* at a position corresponding to the position of the unit contact portion 543 in the longitudinal direction D3. The second spring portion 62 is an example of a second elastic portion.

The first supporting member 54 of the heating unit 5*a* further includes a pair of engagement guide portions 5420 respectively corresponding to the pair of first to-be-engaged portions 542 (see FIG. 4 and FIG. 6). The pair of engagement guide portions 5420 guide the pair of first to-be-engaged portions 542 to the pair of first engagement portions 553.

It is noted that in a case where each of the first to-be-engaged portions 542 has a convex shape and each of the first engagement portions 553 has a concave shape, each of the engagement guide portions 5420 is formed in the second supporting member 55 of the fixing unit 5*b*.

The interlocking mechanism 71 causes the action member 70 to move along the second direction D2. The heating unit 5*a* moves along the second direction D2 in conjunction with the action member 70. In other words, the movement mechanism 7 causes the heating unit 5*a* to move along the second direction D2.

The interlocking mechanism 71 causes the action member 70 to move along the second direction D2 according to an operation made to a predetermined operation portion. For example, the cover member 102 also serves as the operation portion.

By being in conjunction with the movement of the operation portion, the interlocking mechanism 71 causes the action member 70 to move from one of a first position and a second position to the other.

When the action member 70 is at the first position, the heating unit 5*a* is positioned at the reference position in the second direction D2 by a bias force of the unit bias portion 6. In other words, when the heating unit 5*a* is at the reference position, the unit bias portion 6 biases the heating unit 5*a* toward the fixing unit 5*b*. The second position is a position farther away from the fixing unit 5*b* than the first position.

The interlocking mechanism 71 causes the action member 70 to move from the first position to the second position according to a first operation made to the operation portion. For example, the first operation is an operation of moving the cover member 102 from the closing position to the opening position.

In addition, the interlocking mechanism 71 causes the action member 70 to move from the second position to the first position according to a second operation made to the operation portion. For example, the second operation is an operation of moving the cover member 102 from the opening position to the closing position.

The first supporting member 54 of the heating unit 5*a* includes third to-be-engaged portions 545 which engage with a part of the action member 70 (see FIG. 4).

The action member 70 includes third engagement portions 701 capable of engaging with the third to-be-engaged portions 545 (see FIG. 4 and FIG. 6). While the action member 70 moves from the first position to the second position, the third engagement portions 701 engage with the third to-be-engaged portions 545.

When the action member 70 moves from the first position to the second position, the heating unit 5*a* moves from the reference position to the evacuation position by a force received from the action member 70 via the third engagement portions 701. The evacuation position is a position farther away from the fixing unit 5*b* than the reference position.

When the heating unit 5*a* is positioned at the evacuation position, the fixing unit 5*b* can be drawn out from the main body 1 in a detachment direction D11 (see FIG. 5). The fixing unit 5*b* is drawn out from the main body 1 without coming into contact with the heating unit 5*a*. The detachment direction D11 is a direction along the first direction D1.

The heating unit 5*a* is connected to the action member 70 while being capable of rocking between a reference attitude and a tilted attitude. FIG. 4 shows a state where the heating unit 5*a* is in the reference attitude. FIG. 6 shows a state where the heating unit 5*a* is in the tilted attitude.

The reference attitude is an attitude of the heating unit 5*a* when the pair of first engagement portions 553 are engaged with the pair of first to-be-engaged portions 542 (see FIG. 4). The tilted attitude is an attitude that is tilted downwardly in an oblique direction toward the fixing unit 5*b* (see FIG. 6). The tilted attitude is an attitude that is tilted downwardly in the oblique direction from the reference attitude.

When the heating unit 5*a* is at the reference position, the pair of first to-be-engaged portions 542 come into contact with the pair of first engagement portions 553 by a bias force of the first spring portion 61. Specifically, inner surfaces of the concave shape portions of the pair of first to-be-engaged portions 542 respectively come into contact with the pair of first engagement portions 553 (see FIG. 4).

In addition, when the heating unit 5*a* is at the reference position, the pair of unit contact portions 543 come into contact with the pair of to-be-contacted portions 554 by a bias force of the second spring portion 62. In the present embodiment, each of the pair of unit contact portions 543 is a curved surface. Each of the pair of to-be-contacted portions 554 has a convex shape formed along the first direction D1.

In other words, when the heating unit 5*a* is at the reference position, the unit bias portion 6 retains the heating unit 5*a* in the reference attitude. It is noted that when the heating unit 5*a* is at the reference position, the engagement between the third engagement portions 701 and the third to-be-engaged portions 545 is released.

The pair of first to-be-engaged portions 542 and the pair of unit contact portions 543 come into contact with the fixing unit 5*b* at four positions. Thus, the heating unit 5*a* is positioned at a target position in the second direction D2.

Further, the unit bias portion 6 biases the first supporting member 54 to bring the second supporting member 55 into contact with the two supporting column portions 11. In other words, the unit bias portion 6 biases the second supporting member 55 via the first supporting member 54.

Moreover, the second supporting member 55 includes a plurality of column contact portions 552 protruding toward the two supporting column portions 11 (see FIG. 4 to FIG. 6). The plurality of column contact portions 552 respectively come into contact with side surfaces of the two supporting column portions 11.

When the heating unit 5*a* moves at a position farther away from the fixing unit 5*b* than the reference position, the ribs 541 slide on the upper surfaces of the two beam portions 12 (see FIG. 6). In descriptions below, a movement of the heating unit 5*a* at a position farther away from the fixing unit 5*b* than the reference position will be referred to as a slide movement.

It is noted that the two beam portions 12 are an example of a lower supporting member. The lower supporting member supports the heating unit 5*a* from below such that the heating unit 5*a* is movable along the second direction D2. Further, the ribs 541 are an example of a unit slide portion.

When the heating unit 5*a* makes a slide movement, the third engagement portions 701 engage with the third to-be-engaged portions 545 (see FIG. 6). The attitude of the heating unit 5*a* when the third engagement portions 701 are engaged with the third to-be-engaged portions 545 is the tilted attitude. When the heating unit 5*a* is in the tilted attitude, the ribs 541 are in contact with the upper surfaces of the two beam portions 12.

In the present embodiment, when the heating unit 5*a* makes the slide movement, the unit bias portion 6 retains the engagement state between the third engagement portions 701 and the third to-be-engaged portions 545.

When the heating unit 5*a* makes the slide movement, the unit bias portion 6 and the third engagement portions 701 retain the heating unit 5*a* in the tilted attitude. When the heating unit 5*a* makes the slide movement, the unit bias portion 6 constitutes a part of the movement mechanism 7.

In other words, when the movement mechanism 7 causes the heating unit 5*a* to move at a position farther away from the fixing unit 5*b* than the reference position, the movement mechanism 7 retains the heating unit 5*a* in the tilted attitude.

When the heating unit 5*a* moves from the evacuation position toward the reference position by an action of the movement mechanism 7, the engagement guide portions 5420 guide the first to-be-engaged portions 542 to the first engagement portions 553, and further, the second to-be-engaged portion 544 engages with the second engagement portion 321.

When the heating unit 5*a* moves toward the fixing unit 5*b*, the heating unit 5*a* is retained in the tilted attitude. Thus, a positional relationship between the first to-be-engaged portions 542 and the first engagement portions 553 when the engagement guide portions 5420 are in contact with the first engagement portions 553 becomes stable. As a result, the first to-be-engaged portions 542 are guided to the first engagement portions 553 by the engagement guide portions 5420 for sure.

By the second engagement portion 321 engaging with the second to-be-engaged portion 544, the heating unit 5*a* is positioned at a target position in the first direction D1.

Further, when the heating unit 5*a* moves toward the reference position, the engagement guide portions 5420 guide the first to-be-engaged portions 542 to the first engagement portions 553. Furthermore, the engagement guide portions 5420 cause the heating unit 5*a* to rock from the tilted attitude to the reference attitude while guiding the first to-be-engaged portions 542 to the first engagement portions 553. At this time, the heating unit 5*a* rocks about the contact points of the ribs 541 with the upper surfaces of the two beam portions 12. Moreover, the ribs 541 move away from the two beam portions 12 in an upward direction (see FIG. 4).

In a state where the ribs 541 are set apart from the two beam portions 12, the first engagement portions 553 engage with the first to-be-engaged portions 542, and the unit contact portions 543 come into contact with the to-be-contacted portions 554.

The unit bias portion 6 biases the heating unit 5*a* at the reference position. Thus, the unit bias portion 6 retains the engagement state between the first engagement portions 553 and the first to-be-engaged portions 542, and also retains the contact state between the unit contact portions 543 and the to-be-contacted portions 554. The heating unit 5*a* is retained in the reference attitude by the bias force of the unit bias portion 6.

By the pair of first engagement portions 553 engaging with the pair of first to-be-engaged portions 542, the heating unit 5*a* is positioned at a target position in the longitudinal direction D3.

In the present embodiment, the first bias force F1 is stronger than the second bias force F2. In other words, the first spring portion 61 biases the heating unit 5*a* with a stronger force than the second spring portion 62.

The first bias force F1 of the first spring portion 61 acts as a force that lifts the heating unit 5*a* from the position of the tilted attitude to the position of the reference attitude. On the other hand, the second bias force F2 of the second spring portion 62 mainly acts as a force that retains the contact state between the unit contact portions 543 and the to-be-contacted portions 554.

By being sandwiched between the unit bias portion 6 and the two supporting column portions 11, the heating unit 5*a* and the fixing unit 5*b* are positioned at the target positions in the second direction D2.

By adopting the image forming apparatus 10, the heating unit 5*a* can be positioned at the reference position for sure when the movement mechanism 7 causes the heating unit 5*a* to move from a position set apart from the fixing unit 5*b* to the reference position.

As shown in FIG. 8, the image forming apparatus 10 includes a drive mechanism 9 including a drive gear 90. The drive mechanism 9 includes a motor (not shown). The drive mechanism 9 transmits a rotational force to the fixing unit 5*b* via the drive gear 90.

The fixing unit 5*b* includes a driven gear 530 that intermeshes with the drive gear 90. The driven gear 530 transmits the rotational force received from the drive gear 90 to the fixing roller 520. Thus, the fixing belt 52 rotates. In other words, the driven gear 530 transmits the rotational force to the fixing belt 52 via the fixing roller 520.

The pressure roller 53 rotates in conjunction with the rotating fixing belt 52. It is noted that the driven gear 530 is also a gear that transmits the rotational force to the pressure roller 53 via the fixing roller 520 and the fixing belt 52.

A direction of a pressure F3 that the teeth of the driven gear 530 receive from the teeth of the drive gear 90 is a downward oblique direction on the two supporting column portions 11 side (see FIG. 8). Therefore, the pressure F3 that the teeth of the driven gear 530 receive from the teeth of the drive gear 90 acts as a force that biases the fixing unit 5*b* toward the two supporting column portions 11 and the two beam portions 12.

By the pressure F3 received from the drive gear 90, the fixing unit 5*b* is positioned more securely in the second direction D2 and the longitudinal direction D3.

Moreover, the image forming apparatus 10 further includes a cover bias mechanism 8 attached to an inner surface of the cover member 102 (see FIG. 5). Further, the second supporting member 55 of the fixing unit 5*b* includes a beam contact portion 555 protruding downwardly from the lower surface thereof (see FIG. 4 and FIG. 7).

The cover bias mechanism 8 includes a third spring 80, a spring case 81, and a cap portion 82 (see FIG. 5).

The spring case 81 houses the third spring 80. The cap portion 82 is movably attached to the spring case 81. The third spring 80 is an example of an elastic fixing unit bias member.

When the cover member 102 is at the closing position, the third spring 80 is sandwiched between the cover member 102 and the second supporting member 55 of the fixing unit 5*b*. In the present embodiment, the third spring 80 and the cap portion 82 are sandwiched between the cover member 102 and the second supporting member 55.

By being sandwiched between the cover member 102 and the second supporting member 55, the third spring 80 biases the second supporting member 55 in an attachment direction D12 by an elastic force (see FIG. 5). The attachment direction D12 is a direction opposite to the detachment direction D11.

Further, the beam contact portion 555 comes into contact with one of the side surfaces of the two beam portions 12 by a force that the second supporting member 55 receives from the third spring 80 when the cover member 102 is at the closing position. In the present embodiment, the beam contact portion 555 comes into contact with the side surface of the second beam portion 12*b*.

By the actions of the third spring 80 and the beam contact portion 555, the fixing unit 5*b* is positioned in the first direction D1.

It is noted that the cover bias mechanism 8 may be attached to the second supporting member 55 of the fixing unit 5*b*.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus, comprising:

a heating unit which includes a heater and is disposed to extend along a first direction in a main body;

a fixing unit which includes a fixing member that is heated by the heater and a pressure member that biases a sheet toward the fixing member, and is disposed next to the heating unit along the first direction in the main body;

a movement mechanism which causes the heating unit to move along a second direction along which the heating unit and the fixing unit are arranged; and a unit bias portion which biases the heating unit toward the fixing unit when the heating unit is at a reference position in the second direction, wherein the heating unit includes a to-be-engaged portion, the fixing unit includes an engagement portion which engages with the to-be-engaged portion when the heating unit is at the reference position, the heating unit or the fixing unit includes an engagement guide portion which guides the to-be-engaged portion to the engagement portion, the heating unit is connected to the movement mechanism in a state where the heating unit is capable of rocking between a reference attitude and a tilted attitude that is tilted obliquely toward the fixing unit from the reference attitude, the movement mechanism retains the heating unit in the tilted attitude when causing the heating unit to move while the heating unit is at a position farther away from the fixing unit than the reference position, the engagement guide portion causes, when the heating unit moves toward the reference position, the heating unit to rock from the tilted attitude to the reference attitude while guiding the to-be-engaged portion to the engagement portion, the engagement portion engages with the to-be-engaged portion to restrict a movement of the heating unit in a third direction perpendicular to the first direction and the second direction, and the unit bias portion biases the heating unit to retain an engagement state between the engagement portion and the to-be-engaged portion.

2. The image forming apparatus according to claim 1, further comprising a lower supporting member which supports the heating unit from below such that the heating unit is movable along the second direction, wherein the heating unit includes a unit slide portion which slides on an upper surface of the lower supporting member when the heating unit moves at the position farther away from the fixing unit than the reference position, and when the engagement guide portion guides the to-be-engaged portion to the engagement portion, the heating unit rocks about a contact point of the unit slide portion with the upper surface of the lower supporting member, and further, the unit slide portion moves away from the lower supporting member in an upward direction.

3. The image forming apparatus according to claim 1, wherein the heating unit includes a unit contact portion formed at a position set apart from the to-be-engaged portion in the third direction, and the unit contact portion comes into contact with the fixing unit by a bias force of the unit bias portion when the heating unit is at the reference position.

4. The image forming apparatus according to claim 3, wherein the unit contact portion is formed below the to-be-engaged portion in the heating unit, the unit bias portion includes a first elastic portion which elastically biases the heating unit toward the fixing unit at a position corresponding to a position of the to-be-engaged portion in the third direction, and a second elastic portion which elastically biases the heating unit toward the fixing unit at a position corresponding to a position of the unit contact portion in the third direction, and the first elastic portion biases the heating unit with a stronger force than the second elastic portion.

5. The image forming apparatus according to claim 1, wherein the heater is a heating device which uses an induction heating system.

* * * * *